United States Patent
Doron et al.

(10) Patent No.: US 10,887,341 B2
(45) Date of Patent: Jan. 5, 2021

(54) DETECTION AND MITIGATION OF SLOW APPLICATION LAYER DDOS ATTACKS

(71) Applicant: RADWARE, LTD., Tel Aviv (IL)

(72) Inventors: Ehud Doron, Moddiin (IL); Nir Ilani, Givat Brenner (IL); David Aviv, Tel Aviv (IL); Yotam Ben Ezra, Raanana (IL); Amit Bismut, Kiryat Motzkin (IL); Yuriy Arbitman, Raanana (IL)

(73) Assignee: Radware, Ltd., Tel Aviv (IL)

( * ) Notice: Subject to any disclaimer, the term of this patent is extended or adjusted under 35 U.S.C. 154(b) by 161 days.

(21) Appl. No.: 15/657,499

(22) Filed: Jul. 24, 2017

(65) Prior Publication Data

US 2018/0255093 A1    Sep. 6, 2018

Related U.S. Application Data

(60) Provisional application No. 62/467,534, filed on Mar. 6, 2017.

(51) Int. Cl.
*H04L 29/06* (2006.01)
*H04L 29/08* (2006.01)

(52) U.S. Cl.
CPC ...... *H04L 63/1458* (2013.01); *H04L 63/0209* (2013.01); *H04L 63/101* (2013.01); *H04L 63/1416* (2013.01); *H04L 63/1425* (2013.01); *H04L 63/20* (2013.01); *H04L 67/02* (2013.01); *H04L 2463/141* (2013.01)

(58) Field of Classification Search
CPC .............. H04L 63/0209; H04L 63/101; H04L 63/1416; H04L 63/1458
See application file for complete search history.

(56) References Cited

U.S. PATENT DOCUMENTS

| | | |
|---|---|---|
| 8,100,039 B2 | 1/2012 | Gass |
| 8,613,089 B1 | 12/2013 | Holloway et al. |
| 8,739,244 B1 | 5/2014 | Wu et al. |
| 8,843,645 B2 | 9/2014 | Annamalaisami et al. |
| 9,462,010 B1 | 10/2016 | Stevenson |
| 9,729,414 B1 | 8/2017 | Oliveira et al. |
| 2011/0010463 A1 | 1/2011 | Christenson et al. |
| 2012/0124666 A1 | 5/2012 | Kim et al. |

(Continued)

OTHER PUBLICATIONS

Dickerson, et al., "Fuzzy Network Profiling for Intrusion Detection," 2000, Ames, Iowa, IEEE Xplore.

*Primary Examiner* — Jeffrey C Pwu
*Assistant Examiner* — Thong P Truong
(74) *Attorney, Agent, or Firm* — M&B IP Analysts, LLC.

(57) ABSTRACT

A method and system for protecting cloud-hosted applications against application-layer slow distributed denial-of-service (DDoS) attacks. The comprising collecting telemetries from a plurality of sources deployed in at least one cloud computing platform hosting a protected cloud-hosted application; providing a set of rate-based and rate-invariant features based on the collected telemetries; evaluating each feature in the set of rate-based and rate-invariant features to determine whether a behavior of each feature and a behavior of the set of rate-based and rate-invariant features indicate a potential application-layer slow DDoS attack; and causing execution of a mitigation action, when an indication of a potential application-layer slow DDoS attack is determined.

25 Claims, 6 Drawing Sheets

(56) References Cited

U.S. PATENT DOCUMENTS

| | | |
|---|---|---|
| 2012/0216282 A1 | 8/2012 | Pappu et al. |
| 2012/0272289 A1 | 10/2012 | Chang et al. |
| 2012/0324573 A1 | 12/2012 | Kim et al. |
| 2013/0055375 A1* | 2/2013 | Cline ............... H04L 63/14 726/13 |
| 2013/0333029 A1* | 12/2013 | Chesla ............... H04L 45/74 726/22 |
| 2014/0109225 A1 | 4/2014 | Holloway et al. |
| 2014/0157405 A1 | 6/2014 | Joll et al. |
| 2014/0215621 A1 | 7/2014 | Xaypanya et al. |
| 2014/0283051 A1* | 9/2014 | Doron ............. H04L 63/1458 726/23 |
| 2014/0304817 A1 | 10/2014 | Kim et al. |
| 2014/0331304 A1 | 11/2014 | Wong |
| 2016/0127408 A1 | 5/2016 | Miu et al. |
| 2016/0359861 A1 | 12/2016 | Manov et al. |

\* cited by examiner

DETECTION AND MITIGATION OF SLOW APPLICATION LAYER DDOS ATTACKS

CROSS-REFERENCE TO RELATED APPLICATIONS

This application claims the benefit of U.S. Provisional Application No. 62/467,534 filed on Mar. 6, 2017, the contents of which are hereby incorporated by reference.

TECHNICAL FIELD

This disclosure relates generally to cyber-security systems and, more specifically, to techniques for the detection of slow HTTP attacks in an out-of-path environment.

BACKGROUND

With the increasing use of computers in modern society, computer systems have become increasingly subject to cyber-attacks intended to disrupt systems, steal data, cause application defacement, manipulate behavior, or a combination of these goals. Accordingly, the field of cyber security has developed to combat such cyber-attacks. Cyber security is particularly important in cloud computing platforms, where multiple computer resources interact remotely in order to provide services, e.g., sharing of files and applications. Organizations have increasingly adapted their applications to be run from multiple cloud computing platforms, either completely or via hybrid implementations (i.e., such that part of the application is implemented on the premises of an enterprise data center and another part of the application is hosted in one or more public cloud networks). This makes the defending of public cloud-hosted applications much more complex, as the applications are hosted in multiple public cloud locations.

Some leading public cloud service providers include Amazon®, Microsoft®, Google®, Oracle®, Hewlett-Packard®, and so on. To ensure their services are not interrupted, these service providers must protect their customers against cyber security threats. In most cases, providers offer solutions to protect their infrastructure against cyber-attacks.

As more organizations migrate to the cloud, attackers have begun targeting cloud computing platforms and applications hosted therein more frequently, as evidenced by an increasing number of attacks directed to cloud computing assets. Further, to carry out more advanced attacks, attackers have begun combining multiple cyber security threat techniques into a single attack, thereby increasing the likelihood of bypassing defenses. Moreover, cyber security requirements are becoming even more rigorous as attacks become more sophisticated, more vicious, longer lasting, and occur in higher volumes and velocity.

Recently, some services have been developed to provide new security defense services to protect cloud hosted applications. However, such services may be limited in their capabilities and designed to protect cloud applications only in a specific platform where such applications reside. For example, Amazon® offers security services to cloud applications, but such services are restricted to applications that are only hosted in an Amazon cloud via the Amazon Web Services® platform. This is a limiting factor, as cloud hosted applications of a specific tenant (customer) can be executed on-premises and/or in multiple cloud platforms.

Therefore, even when an optimal defense would have been available by a cloud service provider, the defense is limited to one platform and cannot provide protection across platforms. For example, there is currently no security service offered by a cloud service provider that can protect a hybrid execution of a cloud application that is run in both an on-premises datacenter and an Amazon® cloud.

Current cyber-security solutions are limited by their ability to detect and mitigate Distributed Denial-of-Service (DDoS) attacks executed against cloud applications, and particularly a hybrid execution of such applications. One instance of a DDoS attack is carried out by many attackers sending a large amount of data to a target entity, so that a service provided by the target entity may become unavailable.

Traditionally, DDoS attacks have been performed at the layer-3/layer-4 through TCP, UDP or ICMP packets flooding with the aim of consuming resources, such as network bandwidth, processors, or memory. Such L3/L4 cyber-attacks can be efficiently detected and mitigated using available in-line anti-DDoS solutions. DDoS attacks can also be carried out through application-layer (layer-7 or L7) protocols.

One type of L7 DDoS attacks is known as "slow L7 DDoS attacks". Such attacks include, among other techniques, Slowloris and an R-U-Dead-Yet (RUDY) HTTP post. For example, Slowloris is a type of denial of service attack tool which allows a single machine to take down a target machine (e.g., web server) with minimal bandwidth and side effects on unrelated services and ports. A Slowloris tool keeps many connections to the target machine open and holds them open for as long as possible. This is achieved by opening connections to the target machine and sending a partial request. Periodically, the tool will send subsequent HTTP headers, adding to, but never completing, the request. Affected machines will keep these connections open, filling their maximum concurrent connection pool, eventually denying additional connection attempts from legitimate clients.

Because slow L7 DDoS attacks use the weak point of an HTTP by using only a small amount of traffic in a "normal like" TCP connection, it is very difficult to detect such attacks with common DDoS detection means. Current solutions merely provide prevention measures or very costly detection devices. For example, one protection measure includes reducing the time-out duration for waiting for a response packet and restricting the number of cached sessions from the same address or subnet. However, setting such restrictions can cause legitimate users to be blocked as well.

It would therefore be advantageous to provide a solution for detecting slow HTTP attacks that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for protecting cloud-hosted applications against application-layer slow DDoS attacks, comprising: collecting telemetries from a plurality of sources deployed in at least one cloud computing platform hosting a protected cloud-hosted application; providing a set of rate-based and rate-invariant features based on the collected telemetries; evaluating each feature in the set of rate-based and rate-invariant features to determine whether a behavior of each feature and a behavior of the set of rate-based and rate-invariant features indicate a potential application-layer slow DDoS attack; and causing execution of a mitigation action, when an indication of a potential application-layer slow DDoS attack is determined.

Certain embodiments disclosed herein also include a system for protecting cloud-hosted applications against application-layer slow DDoS attacks, the system comprising: a processing circuitry; and a memory, the memory containing instructions that, when executed by the processing circuitry, configure the system to: collect telemetries from a plurality of sources deployed in at least one cloud computing platform hosting a protected cloud-hosted application; provide a set of rate-based and rate-invariant features based on the collected telemetries; evaluate each feature in the set of rate-based and rate-invariant features to determine whether a behavior of each feature and a behavior of the set of rate-based and rate-invariant features indicate a potential application-layer slow DDoS attack; and cause execution of a mitigation action, when an indication of a potential application-layer slow DDoS attack is determined.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
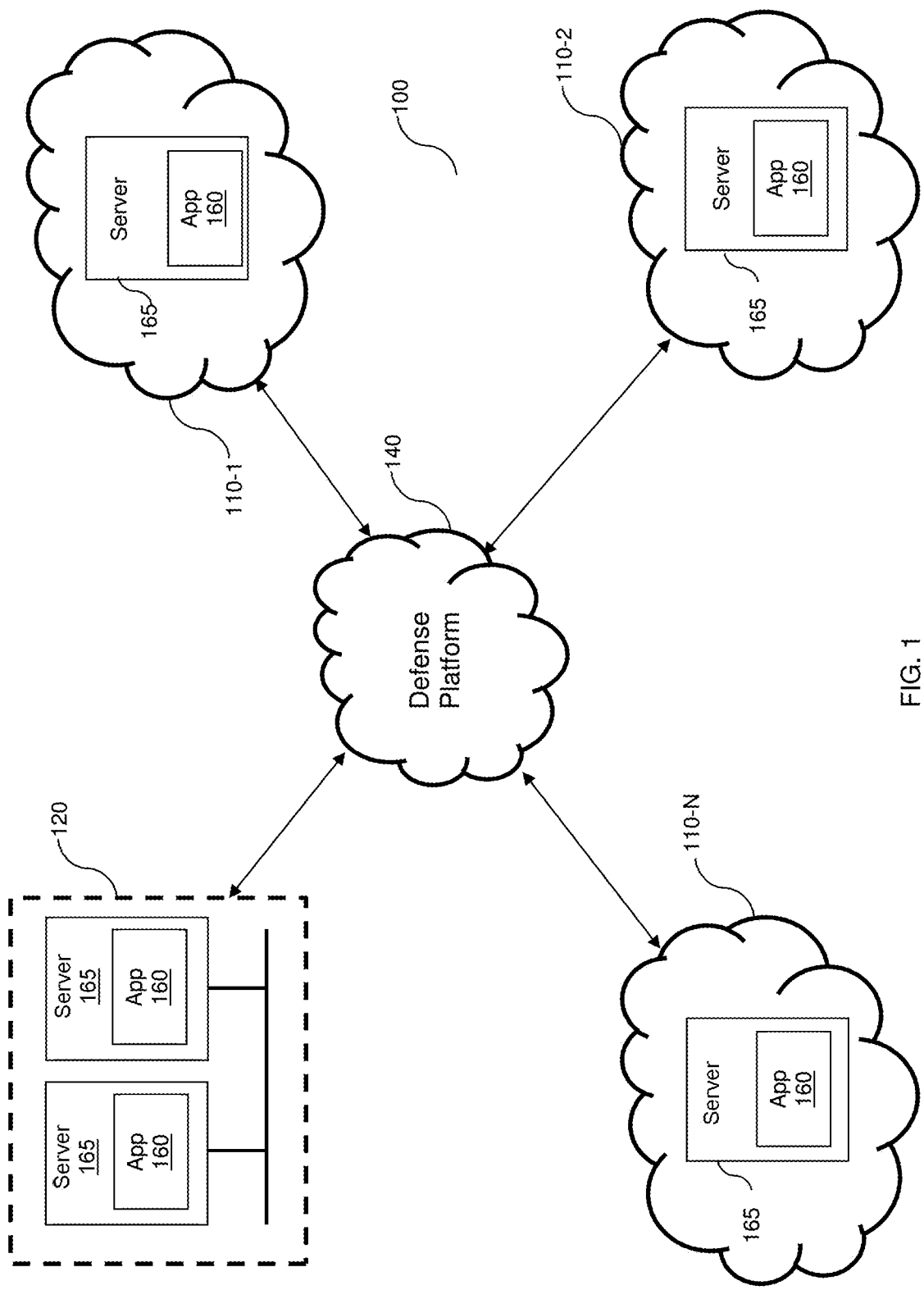
FIG. 1 is a network diagram of a multi-cloud architecture utilized to describe the various disclosed embodiments

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some embodiments disclosed herein include a system and method for detecting and mitigation application layer (L7) DDoS attacks, and, in particular, L7 low-and-slow DDoS attacks. In an embodiment, the disclosed method and system protect cloud-hosted applications or web-hosted applications (hereinafter "protected applications" or "a protected application") hosted in a cloud computing infrastructure. A protected application may be distributed in multiple cloud-computing platforms and/or data centers located at the customer premises. The detection of L7 low-and-slow DDoS attacks (hereinafter referred to collectively as "slow L7 DDoS attacks" for simplicity purposes), may include any type of such attacks, such as SlowLoris, RUDY, malformed HTTP, and the like.

In an embodiment, the detection of slow L7 DDoS attacks is based on telemetries received at a detector deployed out-of-path of traffic to and from protected applications. The telemetries may be received from at least one monitoring system configured to monitor traffic to and from servers, networks, cloud platforms, datacenters, or a combination thereof, which are used to host the protected applications. The received telemetries are monitored or otherwise investigated to detect potential L7 DDoS anomalies and attacks. Upon detection of a potential slow L7 DDoS attack, the traffic associated with the attack is redirected to a mitigation resource such as, e.g., a scrubbing center. The clean traffic is returned to the original application(s) at the cloud computing platform, or to any another embodiment of the data center.

It should be noted that mitigation can be also performed in a cloud computing platform, such as the defense platform. The disclosed embodiments are also designed to protect a hybrid-execution of a cloud-hosted application, i.e., a cloud application being hosted in a multiple-cloud architecture as illustrated in FIG. 1.

FIG. 1 is an example network diagram of a multi-cloud architecture 100 utilized to describe the various disclosed embodiments. The multi-cloud architecture 100 includes a plurality of cloud computing platforms 110-1 through 110-N (where N is an integer greater than 1), a datacenter 120, and a defense platform 140. Each cloud computing platform may be, but is not limited to, a public cloud, a private cloud, or a hybrid cloud. Example cloud computing platforms include Amazon® Web Services (AWS), Cisco® Metacloud, Microsoft® Azure®, Google® Cloud Platform, HP® Cloud, and the like. In an embodiment, the cloud computing platform may serve as infrastructure-as-a-service (IaaS), Platform-as-a-Service (PaaS), Function as a Service (FaaS), or a combination thereof. The datacenter 120 may be an on-premises datacenter. It should be noted that embodiments disclosed herein can support multiple datacenters.

Each of the cloud computing platforms 110-1 through 110-N, and the datacenter 120 executes a protected application 160 which is the protected entity. As noted above, a protected application 160 may be a web application, a cloud hosted application, or any other software application or software resource executed by a server. Examples of a protected application 160 may include an email service, an e-commerce application, a financial application, a mobile application, an Internet of Things (IoT) application, a storage service, a content streaming service, a company Website, or any other service or application that can be accessed by a web browser (not shown).

Often, the protected applications 160 are associated with the same tenant (customer). Typically, the execution of the cloud hosted application is performed by a server (collectively shown as servers 165). Each server 165 may be a virtual machine or a physical machine. A virtual machine may include any virtual environment for executing code or applications.

The protection of the application 160 hosted in the multi-cloud architecture 100 against slow L7 DDoS attacks is performed by means of the defense platform 140. In an embodiment, the defense platform 140 is a cloud computing platform managed by a cloud security vendor (or managed security service provider) that is not one of the service providers of the cloud computing platforms 110-1 through 110-N.

In an embodiment, the defense platform 140 is configured to collect or receive telemetries from, e.g., monitoring systems (not shown in FIG. 1) deployed in each of the cloud platforms 110 and in the data center 120. Based on the received telemetries, a detector (not shown in FIG. 1) deployed in the defense platform 140 is configured to detect potential slow L7 DDoS attacks in the monitored traffic. In an embodiment, the data center 120 may be protected by an in-line detection and mitigation device.

When a potential slow L7 DDoS attack is detected, the traffic is redirected to the defense platform 140. In an example embodiment, the redirection is performed through a DNS configuration as discussed below in an automated fashion, i.e., without requiring a user to reconfigured the DNS entry. In some configurations, the redirection can be triggered by a user.

The defense platform 140 is further configured to "clean" any malicious traffic (data packets) from the received traffic. The cleaned traffic is redirected back to the destination server 165 hosting the protected application 160 that the traffic was originally directed to. The arrangement and operation of the defense platform 140 is further discussed in FIG. 2.

In some optional embodiments, when the attack ends, following a predefined cool-down period set to eliminate attack diversion flipping, the traffic diversion is stopped and traffic is again sent to the destination application directly. This eliminates unnecessary latency throughout the solution lifecycle.

It should be noted that the example implementation shown in FIG. 1 is described with respect to the protected applications hosted in cloud computing platforms 110-1 through 110-N, as well as a single protected data center 120, merely for simplicity purposes and without limitation on the disclosed embodiments. More or fewer cloud computing platforms, data centers, or both, may be protected without departing from the scope of the disclosure. It should be further noted that the disclosed embodiments can operate in multiple-cloud architectures including only two cloud computing platforms or a cloud computing platform and a datacenter. That is, the protected application can be hosted and executed in one or more different and exclusive-mutual platforms.

It should be further noted that two or more defense platforms 140 can be utilized and deployed in the multi-cloud architecture 100.

Figure 2:
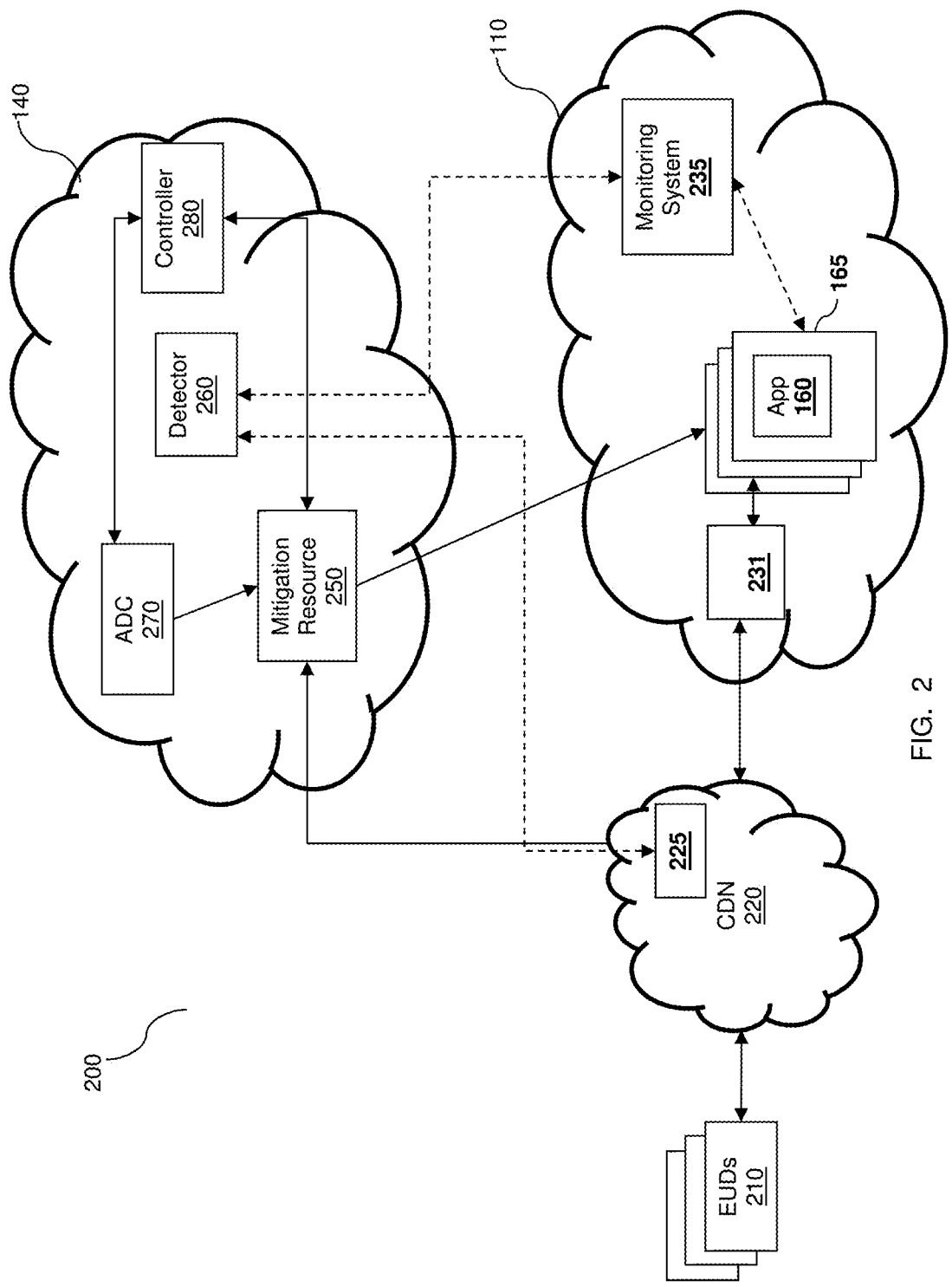
FIG. 2 is a network diagram illustrating deployment of a defense platform according to an embodiment.

FIG. 2 shows an example network diagram 200 utilized to describe the arrangement and operation of the defense platform 140 according to various disclosed embodiments. The example network diagram 200 illustrates a plurality of end-user devices (EUDs) 210, a content delivery network (CDN) 220, a cloud computing platform 110, and the defense platform 140.

The defense platform 140 includes a mitigation resource 250, a detector 260, and a controller 280. It should be noted that the defense platform 140 is separate from the cloud computing platforms 110. In other optional deployments, the defense platform 140 can be part of the public cloud computing platform 110.

In some configurations, the defense platform 140 includes an application delivery controller (ADC) 270. The ADC 270 is configured, among other tasks, to inject clean traffic provided by the mitigation resource 250 back to the cloud computing platform 110.

The EUDs 210 are configured to access a protected application 160 hosted in the cloud computing platform 110 and executed by the servers 165 (FIG. 1). The access to the protected application 160 is through a network, such as the Internet, by means of a web browser or web application and the like installed on a EUD 210. Each of the EUDs 210 may be, but is not limited to, a personal computer, a laptop, a tablet computer, a smartphone, a smart TV, an IoT device, a wearable computing device, or any other device capable of sending and receiving application data.

In an optional deployment, a CDN 220 is communicatively connected between the EUDs 210 and the cloud computing platform 110. The CDN 220 is a system of distributed servers (a network) that deliver webpages and other Web content to a user based on the geographic locations of the user, the origin of the webpage, a content delivery server, and content age and type (static or dynamic).

It should be noted that the EUDs 210, the CDN 220, and the platforms 110 and 140 are all communicatively connected through the Internet, dedicated tunnels or any other communication network. The CDN 220 services can be delivered by the cloud computing platform 110 providers, or by other third-party service providers.

The cloud computing platform 110 may be one of the cloud computing platforms 110-1 through 110-N, or the datacenter 120, discussed in FIG. 1. The cloud computing platform 110 typically includes an edge entity 231 to, for example, load balance the load among the plurality of servers 165.

Each cloud computing platform 110 further includes a monitoring system 235 configured to collect telemetries related at least to attributes of traffic coming in to the cloud computing platform 110, going out of the cloud computing platform 110, or both. The monitoring system 235 may further collect other telemetries related to, e.g., utilization of computing resources (e.g., CPU and memory), elastic load balancing web transactions, HTTP response codes metrics, number of requests, number of errors, number of TCP connections and the like. In another implementation (not shown), the monitoring system 235 may be further communicatively connected to the CDN 220 to allow for, e.g., receiving monitoring data (or telemetry) from the CDN 220. It should be noted that multiple instances of monitoring systems may be distributed in the cloud computing platform 110 without departing from the scope of the disclosure.

In an embodiment, the detector 260 in the defense platform 140 is configured to receive or collect one or more of: telemetries, alerts, and logs, that are related at least to traffic between the cloud computing platform 110 and the protected applications 160, from any reliable source regardless of its deployment. In a further embodiment, the detector 260 is configured to receive or collect telemetries from the monitoring system 235, a monitoring system 225 included in the CDN 220, or both. In yet a further embodiment, the detector 260 interfaces with the monitoring system 235 via an application programming interface (API).

The telemetries may be received continuously, at regular intervals (e.g., once per minute), and the like. The telemetries may be related to, but are not limited to, CPU utilization, latency, TCP connection count (new and current connections), a connection size, a session size, layer 7 HTTP methods or verbs, and other request counts, memory usage, transaction volume, error rate, combinations thereof, and the like. The telemetries may be predefined by one or more operators or owners of the cloud computing platform 110.

In another embodiment, the detector 260 is configured to operate as a layer-7 attack detector by analyzing telemetries related at least to incoming and outgoing traffic flows to detect slow L7 DDoS attacks. Such detection is based on detection of abnormalities in the traffic flows as a deviation from normal behavior. It should be noted that different types of slow L7 DDoS attacks may be detected based on different telemetries.

In an embodiment, the detector 260 is also configured to implement at least one detection engine (not shown in FIG. 2) to detect slow L7 DDoS attacks based on the received telemetries and features extracted therefrom. The detection engine may be configured to monitor the received telemetries, determine a set of features, and to detect slow L7 DDoS attacks using, for example, a fuzzy logic mechanism, a machine learning based classifier, and the like. A feature is an individual measurable property of a phenomenon being observed. For example, a feature can be a number of HTTP requests per second.

In an embodiment, the detector 260 can implement a single dimension detection, multiple dimension detection, or a combination thereof. The single or multiple dimension detection may be based on features related to rate variant and invariant-based detection of various telemetries.

A single dimension detection may include comparing a single feature to a learned baseline level. In an example embodiment, the baseline level is determined using the monitored telemetries and may represent an average or otherwise normal typical value for the telemetries and the thresholds may represent deviations from the baseline (e.g., based on a predetermined number of standard deviations from the baseline or as a percentage from the baseline).

The multiple dimension detection can be performed using fuzzy logic inference system (FIS) engines to evaluate features based on their degree of attacks. The detection of slow L7 DDoS attacks using multiple dimension detection is discussed in more detail below.

In an embodiment, the mitigation resource 250 is communicatively connected to the ADC 270. Upon detection of the potential attack, the controller 280 may be configured to cause a DNS diversion from a normal path of traffic from the EUDs 210 to the mitigation resources 250. That is, when the DNS diversion has occurred, instead of flowing the traffic to the protected cloud-hosted application 160, traffic from the EUDs 210 is diverted to the defense platform 140.

The mitigation resource 250 performs one or more mitigation actions on the traffic and forwards legitimate clean traffic back toward the protected application 160 through the ADC 270. That is, the ADC 270 is configured to send clean traffic to the servers 165 (FIG. 1). In some embodiments, the mitigation resource 250 may be, but is not limited to, an "on the cloud" scrubbing center. In another embodiment, the mitigation resource 250 is a multi-tiered mitigation system. An arrangement, configuration and orchestration of a multi-tiered mitigation system is disclosed in U.S. patent application Ser. No. 14/640,814, assigned to the common assignee, which is hereby incorporated by reference.

The controller 280 is configured to control the traffic diversion to and from the platforms 110 and 140 as well all the mitigation functionalities. Specifically, in an embodiment, upon detection of a potential attack, the controller 280 is configured to signal a detected attack to the mitigation resource 250. The controller 280 is further configured to cause DNS traffic redirection to the defense platform 140 and, in particular, to the mitigation resource 250. The mitigation resource 250 is configured to clean the traffic by executing one or more mitigation actions, and to send the clean traffic directly to the servers 165 for use by the protected application 160. Alternatively, the clean traffic is provided to the ADC 270, which directs such traffic to servers 165 for use by the protected application 160.

In an embodiment, the DNS traffic redirection (for diverting traffic originally directed to the cloud computing platform 110 to the defense platform 140) includes automatically modifying a DNS record entry to point to a virtual IP (VIP) address representing a resource in the defense platform 140 and not to an IP address of the requested domain hosted in the cloud computing platform 110. For example, a request to a domain "www.mysite.com" would be replaced with "po.mysite.clouddetectornet," where such a fully qualified domain name (FQDN) is identified by a different domain name.

In an embodiment, the mitigation resource 250 may be configured to determine when a previously detected slow L7 DDoS attack is terminated. Upon such determination, the controller 280 returns to a peace mode of operation, i.e., DNS traffic redirection is terminated and the DNS operation is returned to its original operation such that traffic is directed from EUDs 210 directly to their original destination server 165 located at the cloud computing platform 110.

It should be noted that a single defense platform 140 and a single mitigation resource 250 are shown in FIG. 2 merely for simplicity purposes and without limitation on the disclosed embodiments. In some deployments, multiple defense platforms including one or more mitigation resources can be utilized. Such deployments allow for elastic scalability, redundancy, and high availability. Further, as demonstrated in FIG. 1, the disclosed embodiments may be utilized to detect cyber-attacks and mitigate traffic related to multiple cloud computing platforms from multiple public cloud vendors, multiple data centers, or both.

According to the disclosed embodiments, the detection of slow L7 DDoS attacks, such as Slowloris or RUDY, is based on rate and rate-invariant features extracted or computed from telemetric data related to the protected applications 160. Specifically, the features are statistically unconditionally related or are not correlated. The telemetric data used for detecting slow L7 DDoS attacks may include, for example, a total number of new TCP connections established between the EUDs 210 and the edge entity 231; a total number of concurrent active TCP connections established between the EUDs 210 and the edge entity 231; a total number of bytes processed per TCP connection by the edge entity; and the like.

In some example embodiments, the features utilized for the multiple dimension detections are: new connections per second (NCPS); connections per second (CPS); and average connection size (ACS). The NCPS is computed based on the received telemetric data of the total number new TCP connections established with the EUDs 210 or between the EUDs 210 and an edge entity 231 of the cloud platform. A non-limiting example for an edge entity is a load balancer. For example, such received telemetries can be gathered for a predefined interval to determine the number of connections per second.

The CPS feature is computed based on the telemetric data of the total number of concurrent active TCP connections established between the EUDs 210 and the edge entity 231.

The CPS can be computed in a similar fashion to the NCPS. The CPS and NCPS are rate-based features.

The ACS feature is computed as the division between the total number of active concurrent TCP connections and the total number of bytes processed by the edge entity 231. The ACS is a rate-invariant feature.

Each feature is evaluated by a FIS engine (not shown) that evaluates a degree of fulfilment (DoF) score of each feature. The various DoF scores are further evaluated by an expert system that determines the degree of attack.

Figure 3:
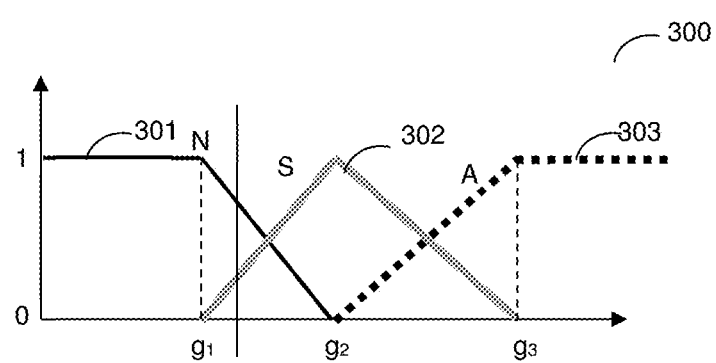
FIG. 3 is an example simulation of an FIS engine utilized to describe multiple-dimension detection according to an embodiment.

As demonstrated in FIG. 3, a FIS engine 300 uses input membership functions for fuzzy analysis for a single feature. In the example shown in FIG. 3, the membership function 301 is a non-attack membership function, the function 302 is a potential attack membership function, and the function 303 is an attack membership function. The membership functions 301, 302, and 303 determine a deterministic score, which is a degree of fulfilment (DoF). The DoF score defines the behavior group that a set of observed features belong to. The DoF scores are evaluated based on certain "breaking points". Such breaking points are shown as $g_1$ for function 301, $g_2$ for function 302, and $g_3$ for function 303.

The values $g_1$, $g_2$, and $g_3$ are dynamically and adaptively set based on the received telemetries. For example, any of the values $g_1$, $g_2$, and $g_3$ can be set based on one or more learned baselines. Such baselines may be set based on moving average telemetries received on the above-mentioned features during a specified time period, such as the last day, week, or month, on an hourly basis. In another embodiment, any of the values $g_1$, $g_2$, and $g_3$ can be computed based on normalized variance of the incoming data (traffic parameters) and the current baseline threshold levels. Examples for computing the baseline threshold levels are discussed in U.S. patent application Ser. No. 15/483,398, assigned to the common assignee, which is hereby incorporated by reference.

According to one embodiment, the FIS engine can be configured to evaluate (fuzzification) each of the features noted above using the appropriate adapted membership function. The result of the evaluation is a DoF score for each feature. The DoF score is scaled to a value between 0 and 1.

In an embodiment, for each moment in time, every graph of a membership function provides three degrees of fulfillment (DoF) scores: DoF for Normal, DoF for Suspicious, and DoF for Attack. The DoF score may be computed as follows: given a graph for a feature and the current value of the feature, a vertical line corresponding to the X coordinate of the feature may be "plotted." As an example, such a computation may result in $DoF^N=0.66$, $DoF^S=0.34$, $DoF^A=0$.

In an embodiment, the FIS engine 300 can be realized through implementation of adaptive algorithms, thereby allowing each detection engine to be continually tuned to fit characteristics of the traffic. Such adaptive algorithms may include, for example, Infinite Impulse Response (IIR) filters, which continually average traffic parameters (e.g., rates of HTTP requests, responses, or both) and modify fuzzy logic breaking points membership functions accordingly. The use of fuzziness for representing the quantitative features monitored for detection of DDoS attacks generally eliminates the abrupt separation of abnormality from normality, providing a measure of the degree of abnormality or normality of a given feature. It should be appreciated that the fuzzy logic techniques allow for automatic detection and mitigation of attacks, and thus eliminates the need for manual protection policy refinements. Using predefined polices does not provide optimal defense against known and emerging threats.

Example implementation of fuzzy logic engines for detecting traffic attributes related to DDoS and DoS can be found in U.S. Pat. Nos. 7,681,235 and 7,836,496, assigned to the common assignee, which are hereby incorporated by reference.

Figure 4:
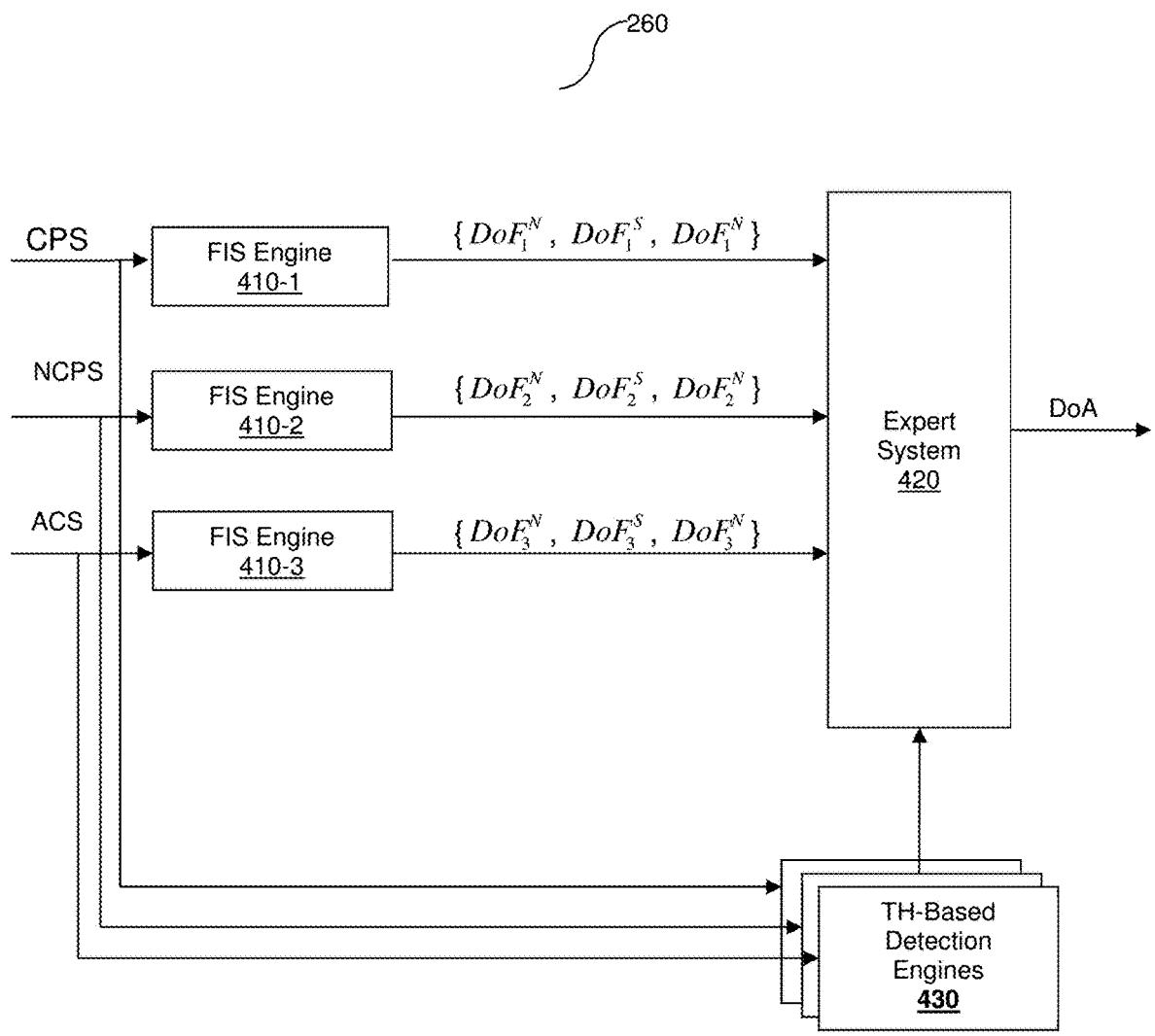
FIG. 4 is a block diagram of a detector for detecting slow L7 DDoS attacks according to an embodiment.

FIG. 4 shows an example block diagram of the detector 260 according to an embodiment. The detector 260 includes FIS engines 410-1, 410-2, and 410-3, each of which is implemented as the FIS engine 300 (FIG. 3). The FIS engines 410-1, 410-2, and 410-3, respectively, determine if the CPS, NCPS, and ACS feature demonstrate normal or abnormal behavior.

The detector 260 also includes an expert system 420, and optionally one or more threshold-based (TH-based) detection engines 430. Each detection engine 430 operates as a single-dimension detector based on a single feature and a baseline threshold.

Figure 6:
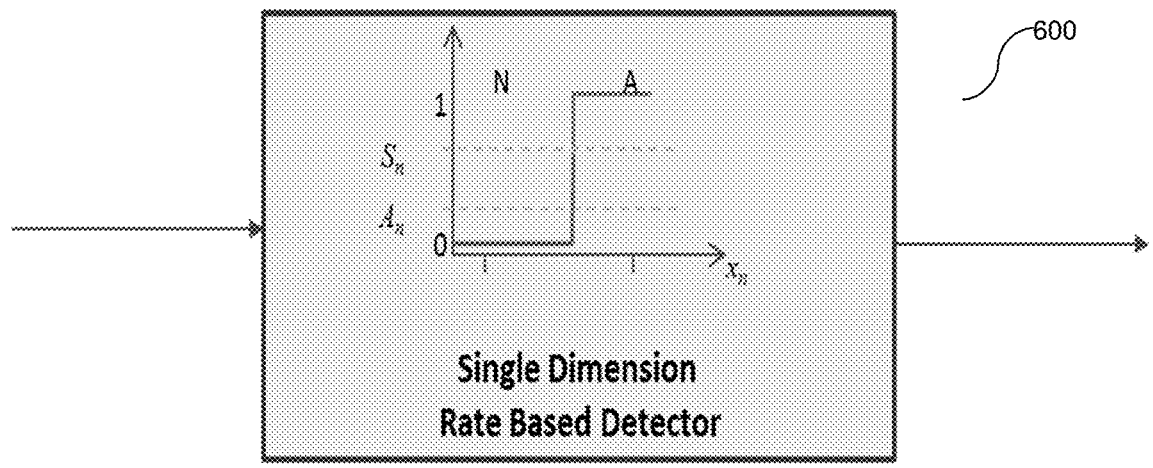
FIG. 6 is a simulation illustrating a single-dimension detection.

As shown in the example simulation 600 shown in FIG. 6, in a single dimension detection, a feature value is validated against one or more baseline thresholds. Detection is based on crossing the baseline thresholds. To this end, the detection engine 430 may be configured to automatically create the baseline thresholds based on monitored features, where potential slow L7 DDoS attacks are detected based on deviations from the baseline thresholds. In an embodiment, the baseline thresholds may include high and low thresholds such that an attack is detected as starting once the high threshold has been passed for a predetermined period and ending once the telemetric value falls below the low threshold over a predetermined period of time. Deviation from the baseline can be manually defined by percentage or can be automatically set, for example as 4 times the standard deviation (STD).

Returning to FIG. 4, the expert system 420 is configured to determine the degree of attack (DoA) score based in part on the DoF scores fed from the FIS engines 410. As noted above, each FIS engine 410 operates on a specific feature and outputs a set of DoF scores $\{DoF_i^N, DoF_i^S, DoF_i^N\}$ representing normal, suspicious, and attack activity.

In an embodiment, the expert system 420 first computes maximal DoF scores $\{DoF^N, DoF^S, DoF^N\}$ over the respective values $\{DoF_i^N, DoF_i^S, DoF_i^N\}$ output by the engines 410-1, 410-2, and 410-3 (i=1, 2, and 3). In this embodiment, the computation is performed as follows:

$$\begin{cases} DoF^N = \max_{\forall i}(DoF_i^N) \\ DoF^S = \max_{\forall i}(DoF_i^S) \\ DoF^A = \max_{\forall i}(DoF_i^A) \end{cases} \quad \text{Eq. 1}$$

Then, based in part on the maximum DoF scores, the DoA score is determined by the expert system 420. In an embodiment, the DoA score is computed as follows:

$$DoA = 2\frac{9 - (1 - DoF_N)^2 - 3(1 - DoF_S)^2 - 5(1 - DoF_A)^2}{3 - (1 - DoF_N)^2 - (1 - DoF_S)^2 - (1 - DoF_A)^2} \quad \text{Eq. 2}$$

The determined DoA is compared to a predefined threshold, where any DoA score exceeding this threshold would trigger an alert or a signal that a slow L7 DDoS attack has been detected. In an optional embodiment, inputs fed from the detection engines 430 are also considered by the expert system 420 if and when an alert should be triggered. In an alternative embodiment, only inputs from engines 410 are considered. Alternatively or collectively, the inputs from the engine 430 may be utilized for the detections. Such inputs would be triggered upon crossing one or more thresholds. It should be appreciated that in some embodiments, one, some, or all of the features can be considered in the DoA determination.

The operation for the expert system 420 can be considered as evaluating the behavioral changes in the monitored features. For example, behavioral changes showing an increase in the CPS and NCPS rates or a decrease in the ACS size would be indicative of an attack. As another example, behavioral changes showing an increase in the NCPS rate and a decrease in the ACS size, while the CPS remains the same, would be indicative of an attack. In another example, behavioral changes showing a decrease in the ACS size, without changes in the CPS and in the NCPS rate, would be indicative of an attack. In addition, behavioral changes showing a decrease in the ACS size, regardless CPS and NCPS, can also be indicative of an attack. All these examples may be deemed evidence of HTTP Slow attacks.

It should be appreciated that the detector 260 operating as discussed above can be utilized to detect slow L7 DDoS attacks, and in particular Slowloris and session attacks, due to the nature in which such attacks behave. For example, a Slowloris attacker often attempts to keep many connections to the target open and hold them open for as long as possible. Limited data is sent over these connections. Thus, detecting an increase in the connections rate (new, active, or both) and a decrease in average connection size would likely be indicative on an attack. Therefore, by implementing the disclosed embodiments, the detector 260 provides an out-of-path (OOP) defense of protected cloud applications hosted in a multi-cloud architecture against at least slow L7 DDoS attacks.

In some embodiments, the detector 260 can be utilized to detect malformed HTTP session attacks. Such attacks are characterized, for example, by bad cipher due to SSL/TLS issues and high errors counts (such as TCP, HTTP response code). In an example embodiment, the detection can be performed using the "single dimension" detection by baselining of each feature real-time values and comparing the baseline with the real-time values.

The features that can be measured and utilized to detect malformed HTTP session attacks include, for example: a Server TLS error count; a Client TLS error count; a Reject Connection count; a Target Connection Error count; an HTTP Error Code count; a total error rate, and the like.

The Server TLS error count is a number of TLS connections initiated by an edge-entity that does not result in an established connection with the target. Client TLS error count is a number of TLS connections initiated by the client that does not result in an established connection, for example but without limitation, with the edge-entity. The Reject Connection count is the number of connections that were rejected because the edge-entity could not establish a connection with the target server. The HTTP Error Code Count is the number of HTTP errors of various codes, such as 2xx, 3xx, 4xx, and 5xx. A total error rate is the percentage of all requests for which the HTTP status code is either 4xx or 5xx. The target connection count is the number of connections that were not successfully established between the edge-entity and the target server.

According to an embodiment, a single dimension detection is utilized. That is, each of the aforementioned features is independently compared to a baseline generated based on real-time features values. It should be noted that one, some, or all of the above-mentioned features can be utilized to detect malformed HTTP session attacks.

Figure 7:
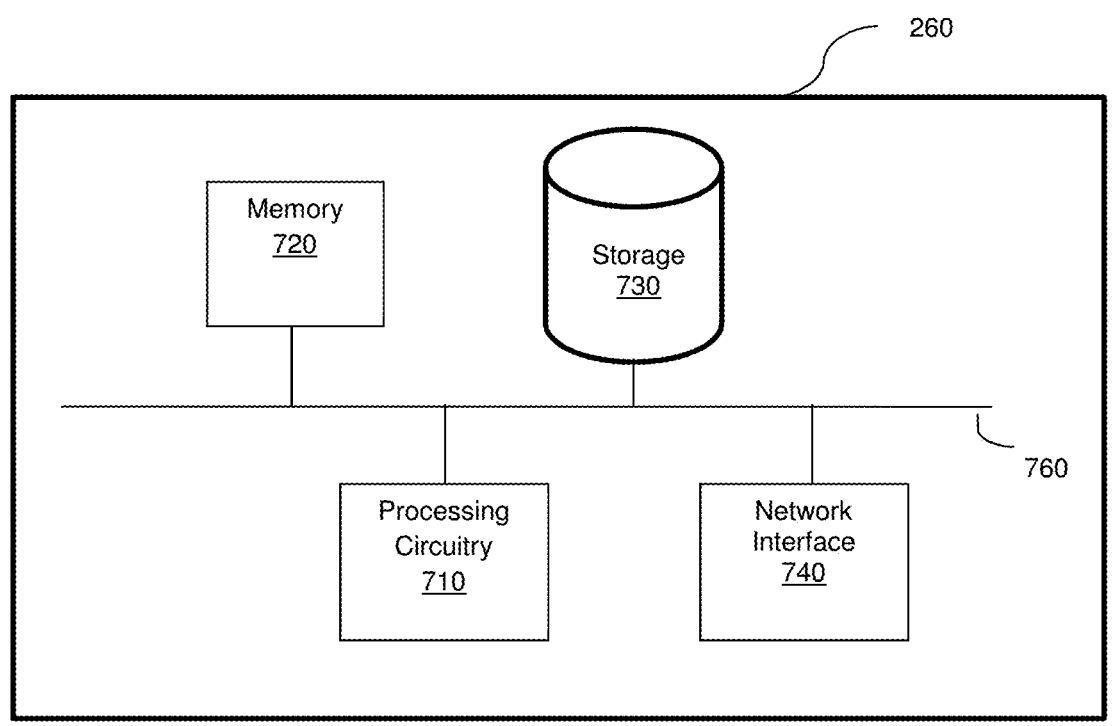
FIG. 7 is a schematic diagram illustrating a detector according to an embodiment.

The various elements of the detector 160 as illustrated in FIG. 4 can be realized using one or more processing circuitries as shown, for example, in FIG. 7.

Figure 5:
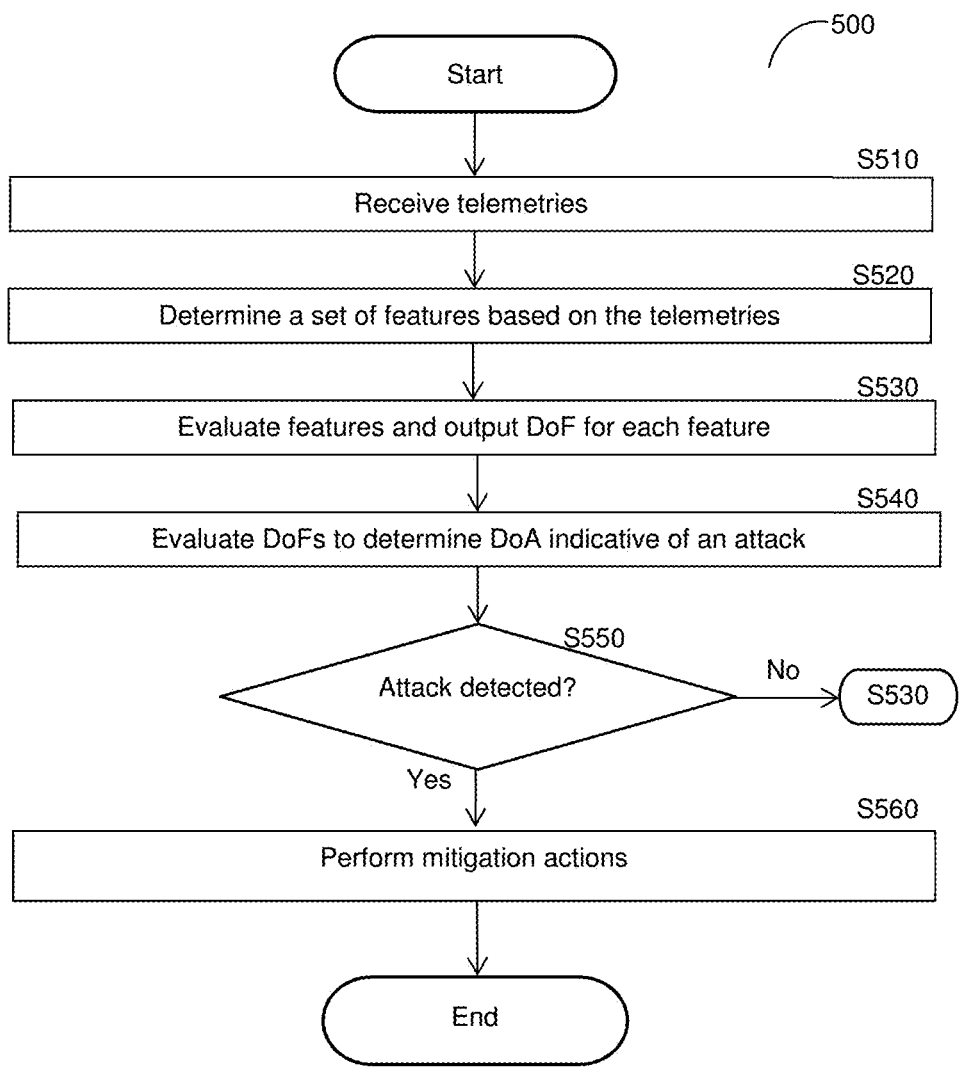
FIG. 5 is a flowchart illustrating a method for detecting and mitigating slow L7 DDoS attacks according to an embodiment.

FIG. 5 is an example flowchart 500 illustrating a method for out-of-path detection and mitigation of slow L7 DDoS attacks executed against protected applications hosted in a multi-cloud architecture according to an embodiment.

At S510, telemetries are received at a defense platform located out-of-path with respect to the protected applications. The telemetries may be received as telemetries from a plurality of monitoring systems deployed in a plurality of public clouds, on-premises locations, or both, where each monitoring system is configured to monitor at least traffic related to the at least one protected application. The telemetries may be received continuously, at predetermined time intervals (e.g., once every minute), and the like.

In an embodiment, telemetries include data on at least a total number of concurrently active TCP connections; a total number of new TCP connections; and a total number of bytes processed by an edge entity in the cloud platform.

In an embodiment, the telemetries are aggregated per protected application. Further, telemetries received on different applications belonging to the same tenant may be aggregated and considered during the detection. Such applications can be executed in different cloud computing platforms, data centers, or both. Thus, the received telemetries can be sourced from different resources.

At S520, the received telemetries are processed to determine, extract, and otherwise compute a set of at least rate-based and rate-invariant features that are utilized for detection of slow L7 DDoS attacks. As discussed above, the set of features includes at least one of CPS, NCPS, and ACS.

At S530, each of the features is evaluated by a FIS engine configured to determine if the respective feature represents a normal or abnormal behavior. The evaluation may be performed using membership functions discussed in detail above. The output of each FIS engine includes DoF scores related to normal, suspicious, and attack traffic, respectively.

At S540, the DoF scores are further evaluated by an expert system to determine a DoA score. The DoA score is indicative of a potential attack. In an embodiment, to detect slow L7 DDoS attacks, the evaluation the various features and their respective DoFs' scores are performed to detect an increase in the connections rate (new and/or active) with a decrease in the average connection size.

It should be noted that the realization of S530 and S540 is not limited to FIS engines and expert systems. In some configuration, the detection of a potential attacks based on the set of features can be performed using, for example, threshold-based engines, machine-learning classifiers, and the like.

In an embodiment, the detection in S530 and S540 may be a combination of multiple dimension detection using FIS engines and single dimension detection using one or more threshold-based engines. Each engine operates on a single feature.

At S550, it is checked if an attack potentially exists based on the value of the DoA score. In an embodiment, S550 includes comparing the DoA score to a predefined threshold. If so, at S560, a detection signal is trigged to cause, for example, execution of at least one mitigation action; otherwise, execution returns to S530.

At S560, when a potential attack has been detected, at least one mitigation action is performed. In an embodiment, S560 may include causing redirection of traffic from a source of the traffic to a mitigation resource. The traffic redirection can be achieved using, for example, DNS redirection.

In an embodiment, the mitigation resource cleans the traffic by removing malicious traffic and sends the clean traffic to at least one server hosting the protected application. In another embodiment, the mitigation action includes automatic configuration of ACLs in the cloud computing platform to prevent direct access to the protected application. The configuration is performed using, for example, APIs.

In some embodiments, when it is determined if it is safe to return to a peace mode of operation, traffic is redirected directly to a destination server hosting the protected application in a cloud platform rather than being routed through the mitigation resource in the defense platform. Such determination can be performed using, for example, an input received from an external system (not shown) or an indication received by monitoring traffic entering the mitigation resource, the defense platform, or both.

FIG. 7 is an example block diagram of the detector 260 according to an embodiment. The detector 260 includes a processing circuitry 710 coupled to a memory 720, a storage 730, and a network interface 740. In an embodiment, the components of the detector 260 may be communicatively connected via a bus 760.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 720 may be volatile (e.g., RAM, etc.), non-volatile (e.g., ROM, flash memory, etc.), or a combination thereof. In one configuration, computer readable instructions to implement one or more embodiments disclosed herein may be stored in the storage 730.

In another embodiment, the memory 720 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 710 to perform the various processes described herein. Specifically, the instructions, when executed, cause the processing circuitry 710 to perform out-of-path detection and mitigation of cyber-attacks, including slow L7 DDoS attacks, as discussed hereinabove. In a further embodiment, the memory 720 may further include a memory portion including the instructions.

The storage 730 may be magnetic storage, optical storage, and the like, and may be realized, for example, as flash memory or other memory technology, CD-ROM, Digital Versatile Disks (DVDs), hard-drives, SSD, or any other medium which can be used to store the desired information. The storage 730 may store communication consumption patterns associated with one or more communications devices.

The network interface 740 allows the detector 260 to communicate with the monitoring systems in order to receive telemetries and alerts related to traffic behavior. The network interface 740 further allows the detector 260 to communicate with the various networks.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for protecting cloud-hosted applications against application-layer slow distributed denial-of-service (DDoS) attacks, comprising:
    collecting telemetries from a plurality of sources deployed in at least one cloud computing platform hosting a protected cloud-hosted application, wherein the telemetries are collected out-of-path of traffic to and from the protected cloud-hosted application;
    providing a set of rate-based and rate-invariant features based on the collected telemetries;
    evaluating each feature in the set of rate-based and rate-invariant features to determine whether a behavior of each feature and a behavior of the set of rate-based and rate-invariant features indicate a potential application-layer slow DDoS attack; and causing execution of a mitigation action, when an indication of a potential application-layer slow DDoS attack is determined.

2. The method of claim 1, wherein the at least one cloud computing platform further includes an on-premises location.

3. The method of claim 1, wherein the protected cloud-hosted application can be hosted in a plurality of cloud computing platforms of various vendors including on-premises locations.

4. The method of claim 1, wherein the collected telemetries include at least one of: a central processing unit utilization, a latency, a new transmission control protocol (TCP) connection count, a current TCP connection count, application-layer hypertext transfer protocol methods, application-layer verbs, application-layer request counts, memory usage, transaction volume, a connection size, a session size, and an error rate.

5. The method of claim 1, wherein the set of rate-based and rate-invariant features includes: new connections per second, connections per second, and average connection size.

6. The method of claim 5, wherein evaluating each feature further comprises:
evaluating, using a fuzzy logic inference engine, a normal degree of fulfilment (DoF) score, a suspicious DoF score, and an attack DoF score.

7. The method of claim 6, further comprising:
evaluating, using an expert system, a degree of attack (DoA) score based on the maximum DoF scores computed over all the DoF scores of all features.

8. The method of claim 7, further comprising:
comparing the DoA score to a predefined threshold, wherein an indication of a potential application-layer slow DDoS attack is determined when the DoA score exceeds the predefined threshold.

9. The method of claim 1, wherein causing execution of the mitigation action further comprises:
redirecting traffic destined to the protected cloud-hosted application to a mitigation resource for at least cleaning the traffic; and
sending the clean traffic to the protected cloud-hosted application.

10. The method of claim 9, wherein the mitigation resource is deployed in a defense cloud computing platform being out-of-path from the at least one cloud computing platform hosting the protected cloud-hosted application.

11. The method of claim 1, wherein the method is performed by a system deployed in the defense cloud computing platform.

12. The method of claim 1, wherein the application-layer slow DDoS attack is any one of: a Slowloris attack, a RUDY attack, a malformed HTTP session attack.

13. A non-transitory computer readable medium having stored thereon instructions for causing processing circuitry to perform a method for protecting cloud-hosted applications against application-layer slow distributed denial-of-service (DDoS) attacks, comprising:
collecting telemetries from a plurality of sources deployed in at least one cloud computing platform hosting a protected cloud-hosted application, wherein the telemetries are collected out-of-path of traffic to and from the protected cloud-hosted application;
providing a set of rate-based and rate-invariant features based on the collected telemetries;
evaluating each feature in the set of rate-based and rate-invariant features to determine whether a behavior of each feature and a behavior of the set of rate-based and rate-invariant features indicate a potential application-layer slow DDoS attack; and
causing execution of a mitigation action, when an indication of a potential application-layer slow DDoS attack is determined.

14. A system for protecting cloud-hosted applications against application-layer slow DDoS attacks, comprising:
a processing circuitry; and
a memory connected to the processor, the memory contains instructions that when executed by the processing circuitry, configure the system to:
collect telemetries from a plurality of sources deployed in at least one cloud computing platform hosting a protected cloud-hosted application, wherein the telemetries are collected out-of-path of traffic to and from the protected cloud-hosted application;
provide a set of rate-based and rate-invariant features based on the collected telemetries;
evaluate each feature in the set of rate-based and rate-invariant features to determine whether a behavior of each feature and a behavior of the set of rate-based and rate-invariant features indicate a potential application-layer slow DDoS attack; and
cause execution of a mitigation action, when an indication of a potential application-layer slow DDoS attack is determined.

15. The system of claim 14, wherein the at least one cloud computing platform further includes an on-premises location.

16. The system of claim 14, wherein the protected cloud-hosted application can be hosted in a plurality of cloud computing platforms of various vendors including on-premises locations.

17. The system of claim 14, wherein the collected telemetries include at least one of: a CPU utilization, a latency, a new TCP connection count, a current TCP connection count, application-layer HTTP methods, application-layer verbs, application-layer request counts, memory usage, transaction volume, a connection size, a session size, and an error rate.

18. The system of claim 14, wherein the set of rate and rate-invariant features includes: new connections per second (NCPS), connection per second (CPS), and average connection size (ACS).

19. The system of claim 18, wherein evaluate each feature further comprises:
evaluate, using a fuzzy logic inference system (FIS) engine, a normal degree of fulfilment (DoF) score, a suspicious DoF score, and an attack DoF score.

20. The system of claim 19, further comprising:
evaluate, using an expert system, a degree of attack (DoA) score based on the maximum DoF scores computed over all the DoF scores of all features.

21. The system of claim 20, further comprising:
compare the DoA score to a predefined threshold, wherein an indication of a potential application-layer slow DDoS attack is determined when the DoA score exceeds the predefined threshold.

22. The system of claim 14, wherein cause execution of the mitigation action further comprising:
redirect traffic destined to the protected cloud-hosted application to a mitigation resource for at least cleaning the traffic; and
send the clean traffic to the destined to the protected cloud-hosted.

23. The system of claim 14, wherein the mitigation resource is deployed in a defense cloud computing platform being out-of-path from the at least one cloud computing platform hosting the protected cloud-hosted application.

24. The system of claim 14, wherein the system is deployed in the defense cloud computing platform.

25. The system of claim 14, wherein the application-layer slow DDoS attack is any one of: a Slowloris attack, a RUDY attack, a malformed HTTP session attack.

* * * * *